United States Patent [19]

Sekmakas et al.

[11] 4,404,336

[45] Sep. 13, 1983

[54] WATER SOLUBLE EPOXY ESTER COPOLYMERS FOR INTERIOR CAN USE

[75] Inventors: Kazys Sekmakas, Palatine; Raj Shah, Schaumburg, both of Ill.

[73] Assignee: DeSoto, Inc., Des Plaines, Ill.

[21] Appl. No.: 294,743

[22] Filed: Aug. 20, 1981

Related U.S. Application Data

[60] Division of Ser. No. 153,429, May 27, 1980, Pat. No. 4,294,737, which is a continuation-in-part of Ser. No. 108,283, Dec. 28, 1979, abandoned.

[51] Int. Cl.³ .................... C08F 283/10; C08G 59/16
[52] U.S. Cl. ..................... 525/531; 525/533
[58] Field of Search ............................... 525/531, 533

[56] References Cited

U.S. PATENT DOCUMENTS 3,736,289  5/1973  Marshall ........................ 525/531
3,969,300  7/1976  Nagata et al. .................. 525/531

*Primary Examiner*—J. Ziegler
*Attorney, Agent, or Firm*—Dressler, Goldsmith, Shore, Sutker & Milnamow, Ltd.

[57] ABSTRACT

Epoxy ester copolymer dispersible in water with the aid of an amine, which may be ammonia, is provided by esterifying a polyepoxide having a 1,2-epoxy equivalency in excess of 1.0 and a molecular weight of from 350 to 8000 with at least 0.5% of the weight of the copolymer of a monoester of a saturated monohydric alcohol with a monoethylenically unsaturated dicarboxylic acid which resists homopolymerization. This polyepoxide ester is copolymerized with from 15% to 70% of monoethylenic monomers, based on the weight of the copolymer, these monoethylenic monomers including carboxyl functional monomer providing an acid number of from 20–150 in the copolymer.

11 Claims, No Drawings

WATER SOLUBLE EPOXY ESTER COPOLYMERS FOR INTERIOR CAN USE

This is a division, of application Ser. No. 153,429, filed 5/27/80, U.S. Pat. No. 4,294,737, which, in turn, is a continuation-in-part of Ser. No. 108,283, filed 12/28/79, now abandoned.

This invention is an improvement over the water soluble epoxy ester copolymers disclosed in our prior applications Ser. No. 18,887, filed Mar. 9, 1979, which is a continuation-in-part of Ser. No. 885,036, filed Mar. 9, 1978, and now abandoned.

TECHNICAL FIELD

This invention relates to water soluble epoxy ester copolymers which are particularly adapted to interior can use where good resistance to extraction by hot water and good odor and flavor characteristics are important, especially for beer and beverage packaging. Other uses including exterior can use are also contemplated.

BACKGROUND ART

Water solution coating compositions have been employed for diverse purposes, but it has been difficult to obtain the good resistance to extraction by hot water and good odor and flavor characteristics which are important to enable application of the coatings to sanitary cans.

In our applications Ser. Nos. 885,036 and 18,887, a relatively low molecular weight polyepoxide, such as a diglycidyl ether of a bisphenol, is esterified with an at least approximately stoichiometric proportion of monocarboxylic acid selected from benzoic acid, a $C_1-C_8$ alkyl-substituted benzoic acid, or a $C_6-C_{10}$ alkanoic acid to produce an ester derivative substantially free of epoxy functionality. The resulting hydroxy functional epoxy ester is then polyesterified with a small amount of monoethylenic dicarboxylic acid which resists homopolymerization, such as fumaric acid, and this unsaturated polyester is then copolymerized with monoethylenic monomers including carboxyl-functional monomer to provide a copolymer which is dispersed in water with the aid of an amine.

It is also known to copolymerize monoethylenic monomers including carboxyl-functional monomer in the presence of a polyepoxide, but this leaves most of the epoxide groups unreacted and much of the copolymer formed remains unassociated with the polyepoxide.

These systems are each inadequate in certain respects, particularly because organic amines are needed for good solubility and stability in water. It is desired to use ammonia because organic amines introduce the possibility of nitrosamine formation, and also because ammonia is more economical and its vapors are less troublesome.

DISCLOSURE OF INVENTION

In this invention, a polyepoxide of somewhat higher molecular weight than used in Ser. Nos. 885,034 and 18,887 is esterified with at least about 1% by weight, based on the total weight of the final epoxy ester copolymer, of a monoester of a saturated monohydric alcohol with a monoethylenically unsaturated dicarboxylic acid which resists homopolymerization, such as monobutyl maleate, to produce an unsaturated ester derivative which may or may not contain residual epoxy functionality. This unsaturated ester is then copolymerized with from 15% to 70% of monoethylenic monomers, based on the weight of the copolymer, to provide a copolymer product. These monomers include monoethylenic carboxylic acid, such as methacrylic acid or fumaric acid, to provide an acid number of from 20–150, preferably 50–120 in the final copolymer so that amine (preferably ammonia) and water can be added to provide a water dispersion which is either a solution or a colloidal dispersion. Reactive monomers, such as hydroxyethyl acrylate or N-methylol acrylamide (or an ether thereof such as the butyl ether) may be used. Alternatively, an aminoplast, such as hexamethoxy methyl melamine, or a water soluble or dispersible phenoplast, or a mixture thereof, may be used for cure. In preferred practice, from 2–30%, based on the total weight of resin, of hexamethoxy methyl melamine monomer or a low molecular weight polymer thereof is used to provide solvent resistance properties in the cured coating. Union carbide product Resimene X 2735 and American Cyanamid product Cymel 370 will illustrate commercial products which may be used.

While very little maleate is needed in this invention, it is indispensible. In the absence of the maleate component, the addition of water and ammonia yielded a mixture which separated on standing. In the same system, the use of the maleate in an amount of 1.7% of the weight of the copolymer provides a stable aqueous dispersion.

The polyepoxides preferably have a 1,2-epoxy equivalency of about 1.4 to about 2.0, but it is only necessary that the epoxy equivalence be more than 1.0. The best properties are obtained using diglycidyl ethers of a bisphenol, such as bisphenol A. The molecular weight of the polyepoxides, which may be provided by the use of mixtures, is from 350 to 8000, preferably 1500 to 5000.

The monoesters of a saturated monohydric alcohol with a monoethylenically unsaturated dicarboxylic acid which resists homopolymerization can vary with the alcohol selected and the acid which is chosen. $C_1-C_{18}$ alkanols, preferably $C_2-C_8$ alkanols are preferred. It is not desired to have the alcohol contain significant unsaturation because this provides too many unsaturated groups. Thus, allyl alcohol leads to a tendency to gel. The preferred alcohol is a butanol, such as n-butanol or isobutanol, but ethanol, propanol, 2-ethoxy ethanol, 2-ethylhexanol, and the like, are all useful, alone or in combination.

Maleic acid, fumaric acid and itaconic acids will illustrate the unsaturated dicarboxylic acids which can be used. It is preferred to form the monoester from the acid in its anhydride form, but this is a background feature herein, and is itself well known.

The maleic half esters are especially preferred and introduce considerable economy into the products of this invention.

While ammonium hydroxide is preferred, organic amines, such as dimethyl ethanol amine, are also useful, and both are embraced by the language "volatile amine". While ammonium hydroxide provides important benefits, as has been noted, there are advantages, such as the capacity to deposit thicker coatings, which favor the use of amines in some circumstances.

The esterification reaction is wholly conventional, simple heating to a hot melt, optionally in the presence of a trace of amine catalyst, being all that is needed. The maleic half ester or other acid is used in an amount of at least about 0.5%, but preferably in an amount of at least 1.0% based on the final copolymer. Based on stoichiometry, it is preferred to use at least 50%, based on the epoxide functionality available for esterification. The esterification reaction is continued to substantial completion, though some unreacted epoxy or acid functionality is not harmful. At least 0.5%, preferably at least 1.0% maleate should be reacted to form an ester with the polyepoxide.

The epoxy ester which is provided contains polymerizable unsaturation, and it is copolymerized with monoethylenic monomers, the bulk of which (at least about %0% by weight) are nonreactive. This means that, aside from their polymerizable unsaturation, they do not react under the conditions of polymerization and use which are contemplated. A similar statement is that there are no functional groups except the polymerizable ethylenic group. Styrene and vinyl toluene are particularly contemplated, though methyl methacrylate, methyl acrylate, ethyl acrylate, acrylonitrile and vinyl acetate will further illustrate the useful materials. Styrene and vinyl toluene are especially important because they copolymerize well with the unsaturated monoesters used for esterification.

Other reactive monoethylenic monomers may be included in an amount up to about 20% of the total polymerizable monomers. These are illustrated by hydroxy monomers, such as 2-hydroxyethyl acrylate, amide monomers, such as acrylamide, N-methylol functional monomers, such as N-methylol acrylamide or ethers thereof, like the butyl ether.

The copolymerization is itself conventional, being carried out in organic solvent solution using a free radical generating polymerization catalyst. These are well known and are illustrated in the examples.

The aminoplast and phenoplast resins which may be used for cure are also well known, and have been illustrated heretofore. This class of water soluble and water dispersible curing agents for curing hydroxy functional resins is a matter of common knowledge in the art. They may be used in an amount up to about 40% of total resin solids, though their use is desirably minimized.

The resulting aqueous solutions cure to provide films characterized by superior resistance to extraction and they resist absorbing odor and flavor components of the foods and beverages which are packaged. They can be applied to any metal can interior, such as aluminum, steel and tin-plated steel. Spray application and cure by baking at 400° F. for 3 minutes are particularly contemplated. Films of about 0.2–0.3 mil are usually formed. Good adhesion is obtained on all of these surfaces.

BEST MODE FOR CARRYING OUT THE INVENTION

The invention is illustrated in the following examples of preferred operation, all parts herein being by weight except where otherwise noted.

EXAMPLE 1 (FORMATION OF MONOBUTYL MALEATE)

45 parts of n-butanol and 49 parts of maleic anhydride are charged to a reactor equipped with a reflux condenser and the mixture is heated to 110° C. and maintained at that temperature for 2 hours during which time the reaction went to completion.

EXAMPLE 2

The product of Example 1 is diluted with 330 parts of n-butanol and 330 parts of 2-butoxy ethanol and then 1000 parts of a diglycidyl ether of bisphenol A having a molecular weight of about 3500 is added slowly over 30 minutes to the solution which is maintained at 110° C.–120° C. The commercial epoxy resin Epon 1007 may be used. The epoxy resin dissolved in the hot solution containing the monobutyl maleate.

4 parts of alkaline catalyst (sodium carbonate) are added to the hot solution and the temperature adjusted to 120° C.–125° C. and the esterification reaction proceeds. The reaction is allowed to continue until the acid value falls below 3 to produce an unsaturated epoxy ester solution.

EXAMPLE 3

A monomer premix is made by mixing together 150 parts of styrene, 100 parts of methacrylic acid and 35 parts of cumene hydroperoxide. This premix is slowly added to the hot unsaturated epoxy ester solution of Example 2 at 120° C. over a 2½ hour period. After monomer addition has been completed, the copolymerization reaction mixture is held at 120° C. for 1 hour and 10 parts of cumene hydroperoxide are then added on two occasions with a 1 hour hold each time to insure complete conversion of monomer to copolymer.

EXAMPLE 4

The copolymer solution of Example 3 is cooled to 80° C. and then 160 parts of a 28% ammonium hydroxide water solution are added with agitation over a 20 minute period. 2200 parts of deionized water are than added over 30 minutes with agitation, and the dispersion product is cooled to 35° C. and strained.

The product is a stable, milky aqueous dispersion containing 32% resin solids with an acid value of 50.

EXAMPLE 5

Hexamethoxymethyl melamine in an amount of 15% by weight of the resin solids in the aqueous dispersion product of Example 4 is placed in a container together with enough n-butanol tl provide a final weight ratio of water to organic solvent of 80:20. The aqueous dispersion is then slowly added with agitation. The final product contains about 22% of resin solids and provides a spray solution which deposits a clear coating.

The sprayed on coating is baked at 400° F. for 3 minutes to provide a final coating of 15 mg/4 sq. in. which exhibited good adhesion and possessed good resistance to pasteurization. The cured film passed 100 double rubs with a methyl ethyl ketone saturated cloth. No objectionable flavor or odor was produced.

EXAMPLE 6

540 grams of Dow product DER-333 (a precatalyzed diglycidyl ether of bisphenol A having an epoxide equivalent weight of 190) are charged to a reactor together with 155 grams of 2-butoxy ethanol. To this is added 338 grams of bisphenol A and the mixture is heated to 170° C. and held for 2 hours. The product is an epoxy functional polyepoxide of increased molecular weight (about the same as Epon 1007).

There is then added 20 grams of monobutyl maleate prepared as in Example 1 and the mixture is held for 2 hours at 170° C. to provide an acid number of less than 1. The product is cooled, 350 grams of n-butanol are added, and then the system is reheated at 120° C.

There is separately prepared a premix of 183 grams of methacrylic acid, 96 grams of styrene and 3 grams of ethyl acrylate in 80 grams of 2-butoxy ethanol containing 19 grams of benzoyl peroxide. This premix is slowly added to the reactor over a 2 hour period at 120° C. The mixture is held for 1 hour and then 8 grams of cumene hydroperoxide are added and the mixture is held for another 1½ hours to complete the conversion of monomers to copolymer.

The copolymer solution is then cooled and 80 grams of 2-butoxy ethanol and 120 grams of n-butanol are added at 105° C. The solution product contains 60.8% solids and has a Gardner viscosity of Z7-Z8. The acid value of the solids is 93.3.

EXAMPLE 7

1000 parts of the solution of Example 6 has added thereto 61.1 parts of dimethyl ethanol amine and then 19.4 parts of hexamethoxy methyl melamine are added. 1000 parts of deionized water are then added with agitation to get a uniform solution. This solution is diluted with 700 parts of deionized water to provide a coating composition adapted for spray application and which contains 21% solids and has a #4 Ford cup viscosity at room temperature of 32 seconds.

This solution is used to provide an aqueous spray for can interiors (two-piece aluminum cans). The coatings are cured at 400° F. for 3 minutes to provide cured coatings weighing 15 mg/4 sq. in. These coatings exhibit excellent beer and water pasteurization resistance and excellent adhesion to the substrate. The cured film passed 10-15 double rubs with a methyl ethyl ketone-saturated cloth. No objectionable flavor or odor was produced.

This example was then repeated only the dimethyl ethanol amine is replaced with a corresponding equivalent proportion of ammonium hydroxide. The same excellent results are obtained. The aqueous compositions are excellently stable regardless of the choice of organic amine or ammonia.

If the monobutyl maleate in Example 6 is omitted, the ammonium hydroxide-containing aqueous composition separated into three distinct layers after standing for 2 weeks at room temperature.

A commercial acrylic copolymer formed by polymerization in the presence of epoxy resin and which has much the same composition as used in Example 6 except there is no esterification with monobutyl maleate, was compared to the product of example 7. In making this comparison, dimethyl formamide was added to the aqueous compositions being compared in order to solubilize the dispersed resin solids. This is done to allow the water and solubilizing amine to be removed which enable further tests to be performed. As expected, the commercial composition formed a clear solution upon the addition of a small quantity of dimethyl formamide. Surprisingly, the aqueous composition of Example 7 yielded a cloudy dispersion, and the dispersed particles did not pass through a 5 micron filter. Thus, the two products are quite different since one in salt form dissolves in a strong solvent and the other in the same form did not. The basis for this difference is not now apparent.

What is claimed is:

1. Epoxy ester copolymer dispersible in water with the aid of an amine comprising a polyepoxide having a 1,2-epoxy equivalency in excess of 1.0 and a molecular weight of from 350 to 8000 esterified with at least about 0.5% of a monoester of a saturated monohydric alcohol with a monoethylenically unsaturated dicarboxylic acid which resists homopolymerization to produce a polyepoxide ester, said polyepoxide ester being copolymerized with from 15% to 70% of monoethylenic monomers including carboxy functional monomer providing an acid number of from 20-150 in the copolymer, all of said proportions being based on the final copolymer of said monomers with said polyepoxide ester.

2. Epoxy ester copolymer as recited in claim 1 in which said polyepoxide is a diglycidyl ether of a bisphenol having a 1,2-epoxy equivalency of from 1.4 to 2.0.

3. Epoxy ester copolymer as recited in claims 1 or 2 in which said polyepoxide has an average molecular weight of from 1500 to 5000.

4. Epoxy ester copolymer as recited in claim 1 in which said monoester is the reaction product of $C_2$–$C_8$ alcohol with maleic anhydride.

5. Epoxy ester copolymer as recited in claim 4 in which said monoester is monobutyl maleate.

6. Epoxy ester copolymer as recited in claim 1 in which said monoester is used in an amount of at least 50% of the stoichiometric amount with respect to the epoxy functionality in said polyepoxide.

7. Epoxy ester copolymer as recited in claim 1 in which said monoester is used in an amount of at least 1% of the copolymer and at least 50% of said monomers are nonreactive.

8. Epoxy ester copolymer as recited in claim 7 in which said nonreactive monomers consist of styrene and vinyl toluene.

9. Epoxy ester copolymer as recited in claim 7 in which the functionality of any nonacidic reactive monomer is selected from the group consisting of hydroxy, amide and N-methylol amide.

10. Epoxy ester copolymer as recited in claim 1 in which said copolymer has an acid number of from 50 to 120.

11. Epoxy ester copolymer as recited in claim 3 in which said polyepoxide is esterified with said monoester to be substantially free of epoxy functionality.

* * * * *